US008352985B2

(12) United States Patent
Ryu et al.

(10) Patent No.: US 8,352,985 B2
(45) Date of Patent: Jan. 8, 2013

(54) METHOD OF STORING AND DISPLAYING BROADCAST CONTENTS AND APPARATUS THEREFOR

(75) Inventors: Won-ho Ryu, Seoul (KR); Hee-seon Park, Seoul (KR); Il-hwan Choi, Suwon-si (KR); Yoon-hee Choi, Suwon-si (KR); Dong-joon Hyun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 545 days.

(21) Appl. No.: 12/329,933

(22) Filed: Dec. 8, 2008

(65) Prior Publication Data

US 2009/0271825 A1    Oct. 29, 2009

(30) Foreign Application Priority Data

Apr. 23, 2008  (KR) .................... 10-2008-0037788

(51) Int. Cl.
*G06F 13/00* (2006.01)
*G06F 3/00* (2006.01)
*H04N 5/445* (2011.01)

(52) U.S. Cl. ............... 725/47; 725/44; 725/45; 725/53

(58) Field of Classification Search ............ 725/37–59; 707/673, 711, 725, 737–741, 749, 797; 715/716, 715/853

See application file for complete search history.

(56) References Cited

U.S. PATENT DOCUMENTS

| | | | |
|---|---|---|---|
| 5,818,510 A * | 10/1998 | Cobbley et al. ............... 725/139 |
| 6,295,092 B1 * | 9/2001 | Hullinger et al. ............. 348/468 |
| 6,920,450 B2 * | 7/2005 | Aono et al. ................... 707/739 |
| 6,961,954 B1 | 11/2005 | Maybury et al. |
| 7,440,947 B2 * | 10/2008 | Adcock et al. ........................ 1/1 |
| 2003/0131362 A1 | 7/2003 | Jasinschi et al. |
| 2004/0125124 A1 * | 7/2004 | Kim et al. ..................... 345/716 |
| 2004/0267738 A1 | 12/2004 | Shin |
| 2005/0238317 A1 | 10/2005 | Horiguchi et al. |

(Continued)

FOREIGN PATENT DOCUMENTS

JP    2005-051493 A    2/2005

(Continued)

OTHER PUBLICATIONS

Bertino et al., "A hierarchical access control model for video database systems," ACM Transactions on Information Systems, 21 (2), pp. 155-191 (2003).*

(Continued)

*Primary Examiner* — Hunter B Lonsberry
(74) *Attorney, Agent, or Firm* — Sughrue Mion, PLLC

(57) ABSTRACT

Provided are method of storing broadcast contents, a method of displaying stored broadcast contents and an apparatus therefor. In method of storing the broadcast contents by analyzing the received broadcast contents, grouping the contents that are similar to each other, and arranging the contents sequentially in time, the method includes classifying a broadcasting signal received from an external broadcast contents provider into an unit segment of a first item, determining at least one keyword representing the first item that is classified into the unit segment, storing the first item as a sub-ordinate item of a first sub contents group according to the determined keywords, and arranging the first sub contents group including the stored first item sequentially in time, so that the progress of specific broadcast contents can be easily identified by each time slot.

21 Claims, 9 Drawing Sheets

U.S. PATENT DOCUMENTS

| | | |
|---|---|---|
| 2006/0085817 A1 | 4/2006 | Kim et al. |
| 2007/0113245 A1 | 5/2007 | Tan et al. |
| 2008/0127270 A1* | 5/2008 | Shipman et al. .............. 725/46 |
| 2009/0113350 A1* | 4/2009 | Hibino et al. .............. 715/853 |

FOREIGN PATENT DOCUMENTS

| | | |
|---|---|---|
| JP | 2008-042895 A | 2/2008 |
| WO | 2005/093752 A1 | 10/2005 |

OTHER PUBLICATIONS

Yao Wang, et al., "Multimedia Content Analysis—Using Both Audio and Visual Clues", IEEE Signal Processing Magazine, IEEE Service Center, Piscataway, NJ, US, vol. 17, No. 6, Nov. 1, 2000, pp. 12-36, XP011089877, ISSN: 1053-5888, DOI: DOI: 10.1109/79.888862.

Saraceno C., et al.: "Indexing Audiovisual Databases Through Joint Audio and Video Processing", International Journal of Imaging Systems and Technology, Wiley and Sons, New York, US, vol. 9, No. 5, Jan. 1, 1998, pp. 320-331, XP000782119, ISSN: 0899-9457, DOI: DOI: 10.1002/(SICI)1098-1098(1998)9:5<320::AID-IMA2>3.0.CO;2-C.

Boykin S., et al., "Improving broadcast news segmentation processing", Multimedia Computing and Systems, 1999, IEEE International Conference on Florence, Italy Jun. 7-11, 1999, Los Alamitos, CA, USA, IEEE Comput. Soc, US, vol. 1, Jun. 7, 1999, pp. 744-749, XP010342798, DOI: DOI:10.1109/MMCS.1999.779292, ISBN: 978-0-7695-0253-3.

Snoek C. G. M., et al., "Multimodal Video Indexing: A Review of the State-of-the-art", Multimedia Tools and Applications, Kluwer Academic Publishers, Boston, US, vol. 25, Jan. 1, 2005, pp. 5-35, XP007902684, ISSN: 1380-7501, DOI: DOI: 10.1023/B:MTAP.0000046380.27575.A5.

Extended European Search Report issued Apr. 4, 2011 in counterpart European Application No. 08873998.2.

Communication, dated Jan. 5, 2012, issued by the State Intellectual Property Office of P.R. China in corresponding Chinese Application No. 200880128712.4.

* cited by examiner

METHOD OF STORING AND DISPLAYING BROADCAST CONTENTS AND APPARATUS THEREFOR

CROSS-REFERENCE TO RELATED PATENT APPLICATION

This application claims the benefit of Korean Patent Application No. 10-2008-0037788, filed on Apr. 23, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to storing broadcast contents, displaying the stored broadcast contents, and more particularly, to a method of storing broadcast contents by analyzing the broadcast contents, grouping the contents that are similar to each other, and arranging the contents sequentially, a method of displaying the stored broadcast contents so they can be browsed, and an apparatus therefor.

2. Description of the Related Art

FIG. 1 is a flowchart illustrating a conventional method of storing a data stream in a personal video recorder (PVR).

Referring to FIG. 1, in operation 100, a broadcast stream of a program requested by a user from his/her selection of a channel is selectively received through a tuner equipped with the PVR from among broadcasting signals being transmitted from a number of broadcast stations.

Then, broadcast program guide information is searched for in order to check prior information about the broadcast stream, such as, the name of the program, and whether configuration information according to each theme of the program exists, in operation 110.

If the configuration information is detected from the broadcast program guide information in operation 110, the program is divided into a number of segments according to the configuration information, in operation 120. That is, the overall complete program is physically divided into a number of files according to each theme to be stored.

Meanwhile, if the configuration information according to the theme is not detected from the broadcast program guide information in operation 110, the program is reconfigured into segments of predetermined time units (for example, 10 minutes), in operation 130.

For example, when a user receives a news program from a broadcast station, themes such as headline news, main news, weather, and sports news is detected through the configuration information recorded in the news program guide information and the configuration information is divided into segments according to each theme.

In addition, when the configuration information is not recorded in a header unit of the news program guide information, the news program is divided into a number of segments according to predetermined time units.

However, according to the prior art, in broadcast contents such as news, the amount of new broadcast channels has increased and thus a user cannot view all news contents broadcast each day and the progress of a specific event from a specific past time to the current point, that is, a history of the event, cannot be efficiently identified.

Therefore, methods of effectively finding the user's desired news in a limited viewing time and identifying the progress of the specific event by time are needed.

SUMMARY OF THE INVENTION

The present invention provides a method of storing broadcast contents by analyzing the broadcast contents such as news contents, grouping the contents that are similar to each other in a segment unit, and arranging the contents sequentially, a method of displaying the stored broadcast contents so they can be browsed, and an apparatus therefor.

According to an aspect of the present invention, there is provided a method of storing broadcast contents, the method including: classifying a broadcasting signal received from an external broadcast contents provider into an unit segment of a first item; determining at least one keyword representing the first item that is classified into the unit segment; storing the first item as a sub-ordinate item of a first sub contents group according to the determined keywords; and arranging the first sub contents group including the stored first item sequentially in time.

The storing may include: calculating a similarity between the keywords of the first item and keywords of a pre-stored second item; and clustering the first item into the first sub contents group in which the second item is included, based on the calculated similarity.

The method of storing broadcast contents may further include storing the first sub contents group as a sub-ordinate item of a first main contents group, wherein the storing may include: calculating a similarity between the first sub contents group and the pre-stored second sub contents group; and clustering the first sub contents group into the first main contents group in which the second sub contents group is included, based on the calculated similarity.

The method of storing broadcast contents may further include arranging the first main contents group including the stored first sub contents group sequentially in time.

The determining at least one keyword may include: extracting subtitle information from the received broadcasting signal; and selecting at least one keyword from the extracted subtitle information.

The method of storing broadcast contents may further include: generating a title of the first item by using the determined keywords; and generating titles of the first sub contents group in which the first item is included and the first main contents group in which the first sub contents group is included according to the frequency of generation of the title of the first item.

According to another aspect of the present invention, there is provided a method of displaying stored broadcast contents, the method including: selecting a predetermined first main contents group from among at least one main contents group; listing at least one sub contents group included in the selected first main contents group sequentially in time; selecting a predetermined first sub contents group from among the listed sub contents groups; and displaying at least one item included in a time slot of the selected first sub contents group.

The first sub contents group may be included in a same cluster as a second sub contents group, the second sub contents group depending on a similarity between the first sub contents group and the second sub contents group; and a predetermined first item from among the items is included in a same cluster as a second item, the second item depending on a similarity between the first item and the second item. The at least one main contents group is listed according to a time slot.

The listed main contents groups or sub-contents groups may display the number of the items included in the corresponding time slot as a number or in graph form.

The listed main contents groups or sub-contents groups may be displayed in a tag cloud form.

According to another aspect of the present invention, there is provided an apparatus for storing broadcast contents, the apparatus including: a receiver which classifies a broadcasting signal received from an external broadcast contents provider into unit segment of a first item; a keyword determining unit which determines at least one keyword representing the first item that is classified into the segments; a storage management unit which stores the first item as a sub-ordinate item of a first sub contents group according to the determined keywords; and an arranging unit which arranges the first sub contents group including the stored first item sequentially in time.

The storage management unit may include: a similarity calculating unit calculating a similarity between the keywords of the first item and keywords of a pre-stored second item; and a clustering unit clustering the first item into the first sub contents group in which the second item is included, based on the calculated similarity.

The storage management unit may store the first sub contents group in storage as a sub-ordinate item of a first main contents group, the similarity calculating unit calculates a similarity between the first sub contents group and pre-stored second sub contents group; and the clustering unit clusters the first sub contents group into the first main contents group in which the second sub contents group is included, based on the calculated similarity.

The arranging unit may arrange the first main contents group including the stored first sub contents group sequentially.

The keyword determining unit may include: a subtitle information processing unit extracting subtitle information from the received broadcasting signal; and a keyword selecting unit selecting at least one keyword from the extracted subtitle information.

The apparatus for storing broadcast contents may further include a title generator generating a title of the first item using the determined keywords, wherein the title generator generates titles of the first sub contents group in which the first item is included and the first main contents group in which the first sub contents group is included according to the frequency of generation of the title of the first item.

According to another aspect of the present invention, there is provided an apparatus for displaying stored broadcast contents, the apparatus including: a first selecting unit selecting a predetermined first main contents group from among at least one main contents group; a first supplementary image processing unit listing at least one sub contents group included in the selected first main contents group sequentially in time; a second selecting unit selecting a predetermined first sub contents group from among the listed sub contents groups; and a second supplementary image processing unit displaying at least one item included in a time slot of the selected first sub contents group.

The first sub contents group may be included in a same cluster as a second sub contents group, the second sub contents group depending on a similarity between the first sub contents group and the second sub contents group; and a predetermined first item from among the items is included in a same cluster as a second item, the second item depending on a similarity between first item and the second item.

The at least one main contents group may be listed according to a time slot and the listed main contents groups or sub-contents groups display the number of the items included in the corresponding time slot as a number or in graph form.

The listed main contents groups or sub-contents groups may be displayed in a tag cloud form.

According to another aspect of the present invention, there is provided a computer readable recording medium having embodied thereon a computer program for executing a method of storing broadcast contents or a method of displaying stored broadcast contents.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
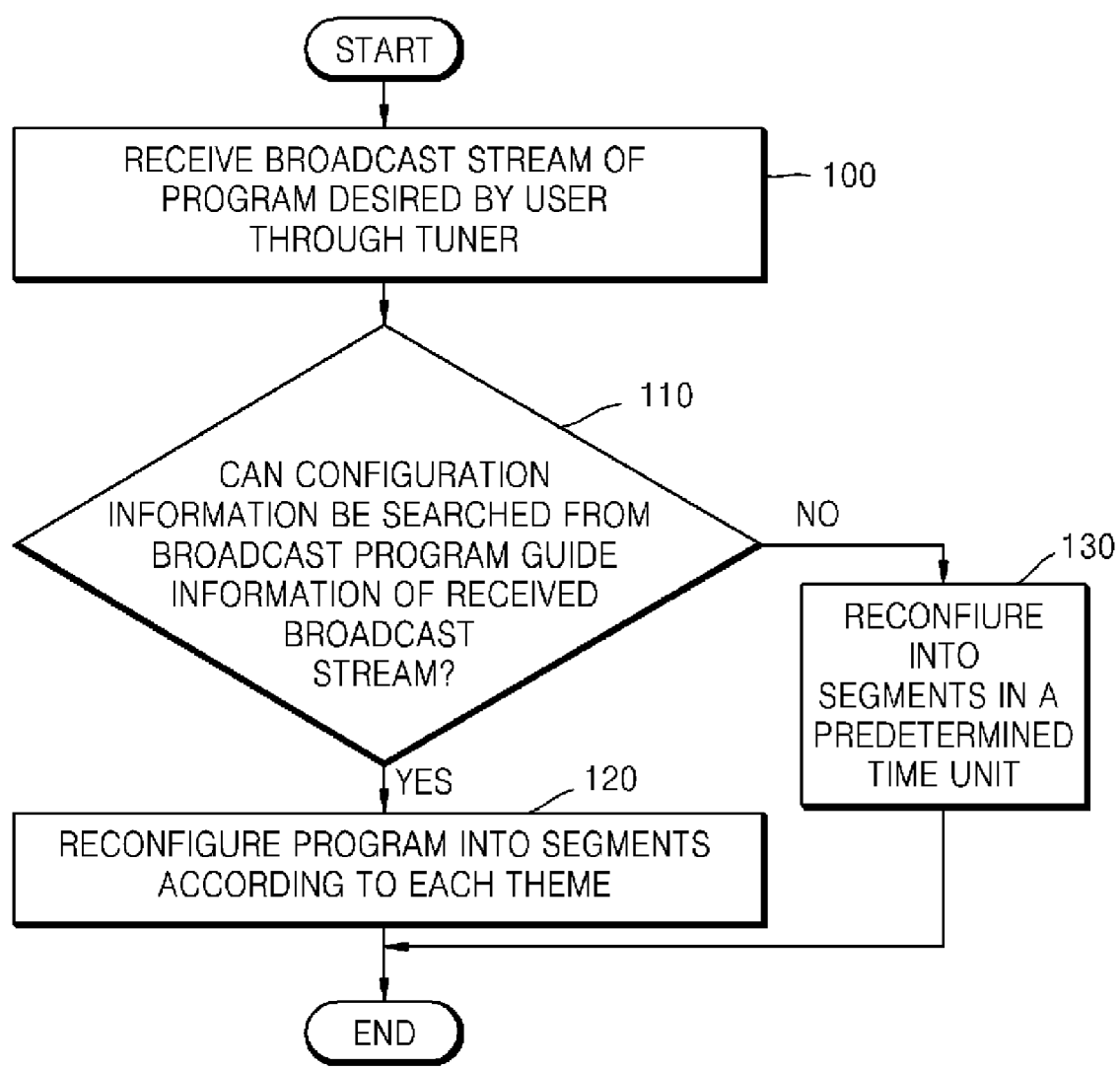
FIG. 1 is a flowchart illustrating a conventional method of storing a data stream in a personal video recorder (PVR)
Figure 2:
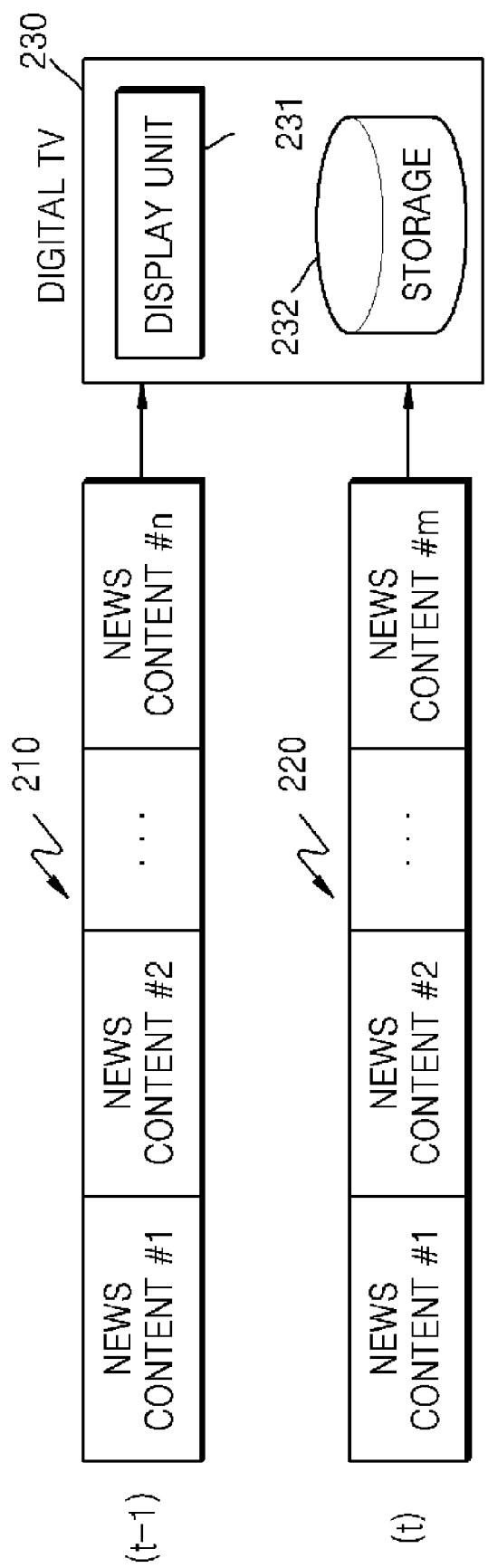
FIG. 2 is a diagram illustrating a digital TV which receives news contents in each time slot.

FIG. 2 is a diagram illustrating a digital TV which receives news contents in each time slot.

Referring to FIG. 2, a digital TV 230 is illustrated, wherein the digital TV 230 receives news contents 210 and news contents 220 and displays the news contents 210 and 220 through a display unit 231. News content #1 through news content #n in news contents 210, are all broadcast at the past point of time t-1 and news content #1 news content #m in news contents 220, are all broadcast at the current point of time t.

The digital TV 230 may include storage 232 which can store various broadcast contents including news contents. The storage 232 may be a storage medium included within the digital TV 230 or a storage medium included in a remote server (not shown).

In such an environment in which broadcast contents is serviced, a user cannot view all news contents broadcast every day, as illustrated above, and cannot recognize the progress of a specific event from a specific past time to the current point, that is, a history of the event.

Therefore, in the present invention, a method of analyzing, grouping and storing broadcast contents and browsing the stored broadcast sequentially is introduced.

Figure 3:
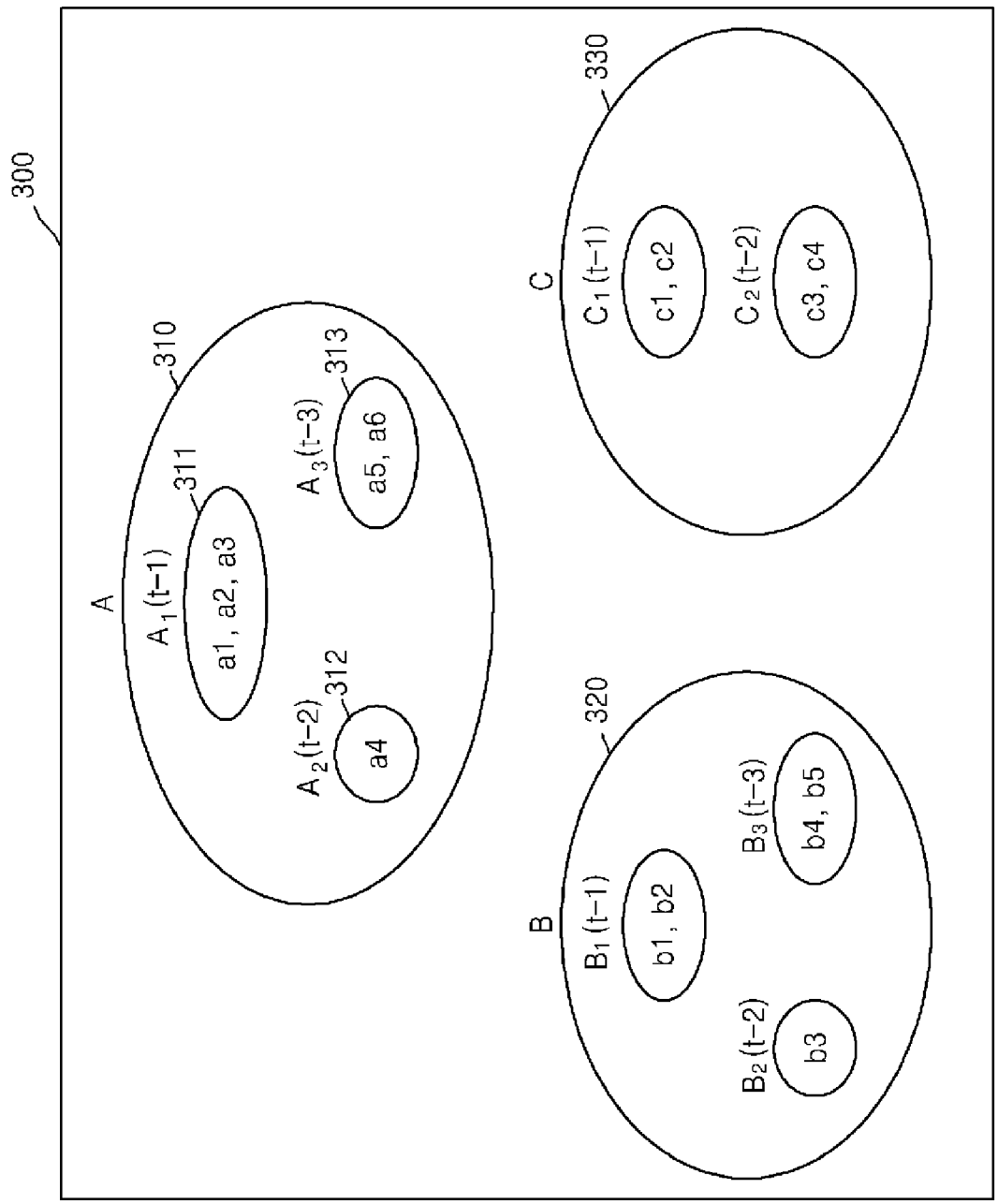
FIG. 3 is a diagram illustrating a cluster for a sub-content group and a main contents group each including a plurality of events, according to an embodiment of the present invention.

FIG. 3 is a diagram illustrating a cluster of news contents relating to a single or related events, in a sub content group. FIG. 3 also shows a cluster of sub content groups representing a plurality of events, in a main content group, according to an embodiment of the present invention.

In this embodiment, the segment units are news contents from among broadcast contents. Each of the news contents (e.g. news content #1 through news content #n 210 in FIG. 2) may have a news topic and the event relates to a specific news topic (see reference numbers 721, 722, 723 of FIG. 7B). However, the present invention is not limited thereto. It will be obvious to one of ordinary skill in the art to which the present invention pertains that the broadcast contents can be any other broadcast contents other than news contents, which can be stored and browsed according to the time when the other broadcast contents are generated.

FIG. 3 illustrates how the number of the news contents stored in storage 300 is grouped, arranged, and stored.

First, when separate news contents for each event or related events are respectively indicated as a1-a6, b1-b5, and c1-c4, the news contents a1-a6 and the news contents b1-b6 refer to different events. However, the news content a1 and the news content a2 refer to the same or related events.

For example, a1, a2, and a3 are news contents for the same, similar or related events and can be grouped as a sub contents group $A_1$ 311. In addition, since the sub contents groups are arranged sequentially, $A_1$, $A_2$, and $A_3$ respectively indicate news generated t-1, t-2, and t-3 before the current point of time t. More specifically, when the news contents a1, a2, and a3, which are all generated at t-1, are all related to one event represented by the sub contents group $A_1$ 311, the news contents a1, a2, and a3 are clustered into the sub content group $A_1$. Similarly, a4 is the news content generated at t-2 and is related to the event represented by the sub contents group $A_2$ 312. a5 and a6 are the news contents generated at t-3 and are related to the event represented by the sub content group $A_3$ 323, thereby being clustered together as sub-ordinate item in the sub content group $A_3$.

In addition, $A_1$, $A_2$, and $A_3$ represent similar events which are generated at different time slots and can be grouped together in a main contents group A 310. The above process is applied to other main contents groups B 320 and C 330.

Figure 4:
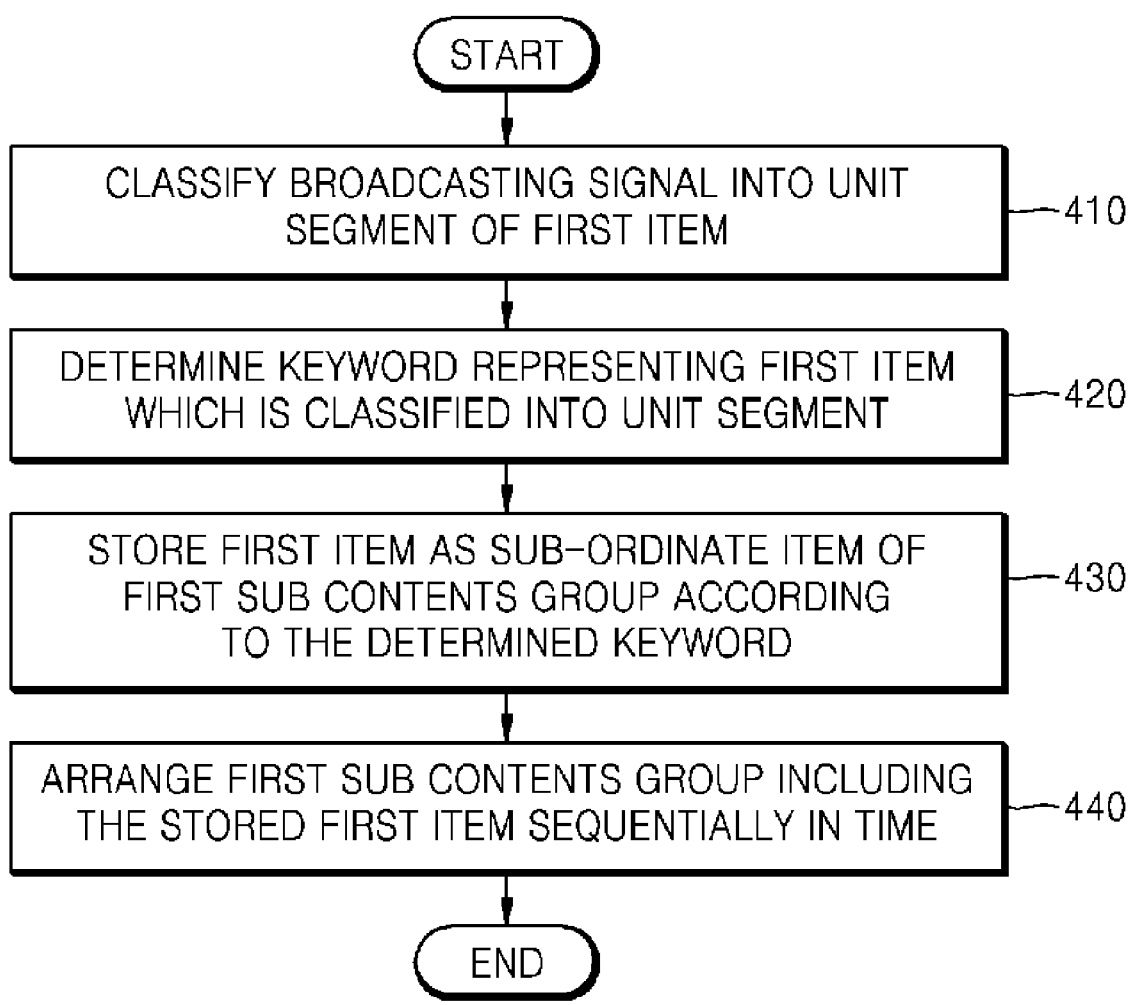
FIG. 4 is a flowchart illustrating a method of storing broadcast contents, according to an embodiment of the present invention.

FIG. 4 is a flowchart illustrating a method of storing broadcast contents, according to an embodiment of the present invention.

Referring to FIG. 4, the method of storing the broadcast contents according to the current embodiment of the present invention includes classifying a broadcasting signal received from an external broadcast contents provider into an unit segment of a first item in operation 410. The method further includes determining at least one keyword representing the first item that is classified into the unit segment in operation 420, storing the first item as a sub-ordinate item of a first sub contents group according to the determined keywords in operation 430, and arranging the first sub contents group including the stored first item sequentially in time in operation 440.

Considering each operation, as illustrated in FIG. 2, the news contents #1 to #n for each event included in a news contents series stream are classified into segment units at, for example, t-1, in operation 410.

In operation 420, when it is assumed that one of the news contents relates to a first item, at least one keyword capable of representing that the first item is determined. Here, the keyword is an identifier which can be used to identify each of the news contents and is used later as an input variable value when calculating similarities between each item and contents group.

In operation 430, the news contents (i.e. the first item) with a keyword are stored as the sub-ordinate item of a sub contents group based on the determined keyword. As illustrated in FIG. 3, a1, a2, and a3 which are separate news contents, are stored as the sub-ordinate item included in a sub contents group $A_1$.

In operation 440, the sub contents group including the stored news contents representing the first item is arranged sequentially in time. Accordingly, the sub content groups can be sequentially arranged as $A_1$ at (t-1), $A_2$ at (t-2), and $A_3$ at (t-3). The method of arranging sequentially in time may be accomplished based on a year, week, day, and hour.

As a modified example of the method of storing the broadcast contents, the method of storing the broadcast contents according to the current embodiment includes classifying the broadcasting signal into unit segments of the first item, the broadcasting signal being received from an external broadcast contents provider, determining at least one keyword representing each classified unit segment, storing the unit segments of the items as sub-ordinate item of first sub contents group based on the determined keyword, generating second sub contents group based on remaining keywords, except for the representative key word, with respect to unit segments included in the first sub contents group, and arranging the first and second sub contents group sequentially, so that the progress of specific broadcast contents can be easily identified by each time slot.

In other words, even if the unit segments are of the same first item and include a plurality of keywords, the unit segments may be included in the second sub contents group, in addition to the first sub contents group.

Figure 5:
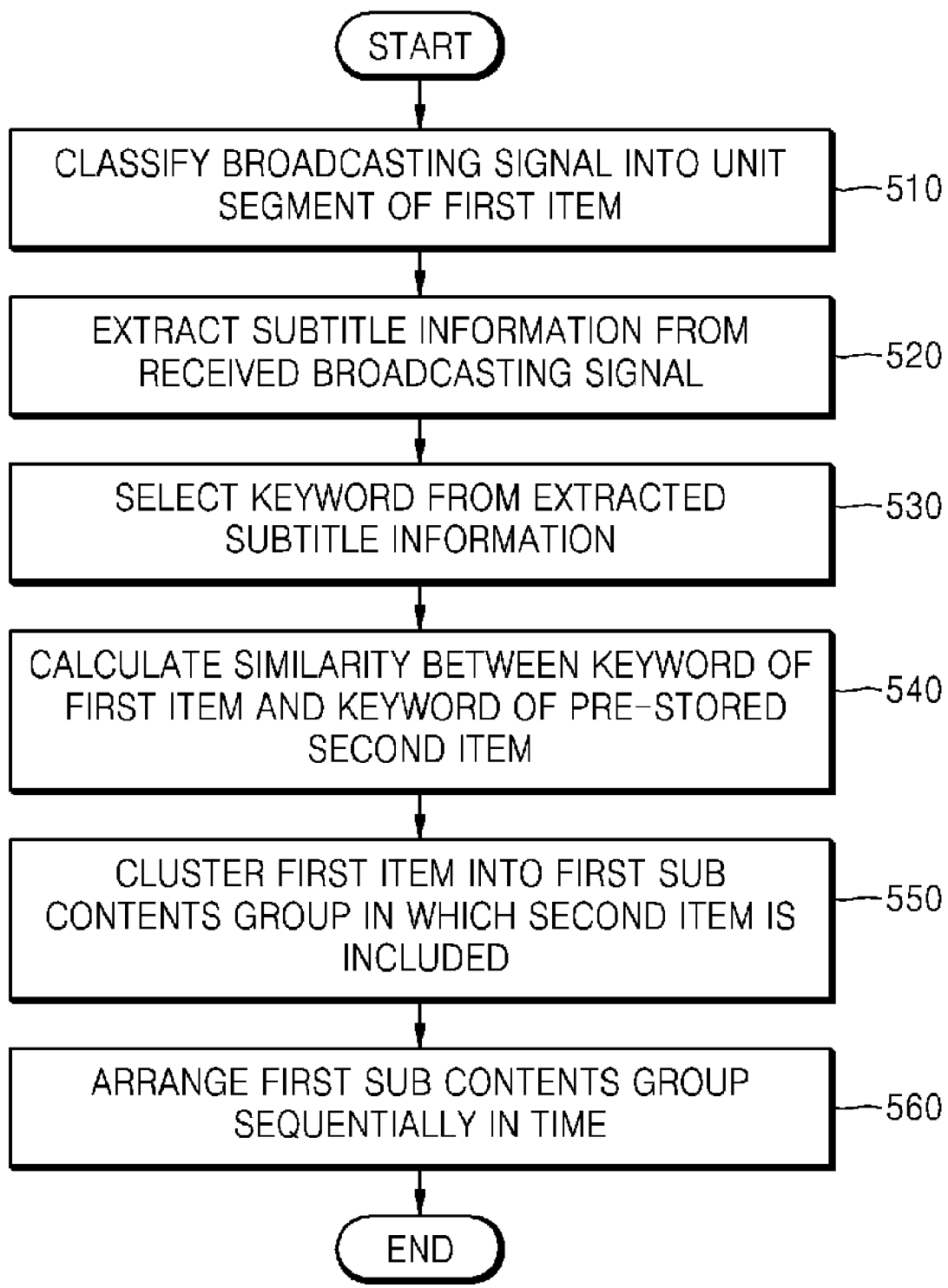
FIG. 5 is a flowchart illustrating a method of storing broadcast contents, according to another embodiment of the present invention.

FIG. 5 is a flowchart illustrating a method of storing broadcast contents, according to another embodiment of the present invention.

Referring to FIG. 5, the method of storing broadcast contents according to the current embodiment of the present invention includes classifying a broadcasting signal received from an external broadcast contents provider into an unit segment of a first item in operation 510, extracting subtitle information from the received broadcasting signal in operation 520, determining at least one keyword representing the first item that is classified into the unit segment in operation 530, calculating a similarity between the keywords of the first item and keywords of a pre-stored second item in operation 540, clustering the first item into the first sub contents group in which the second item is included, based on the calculated similarity in operation 550, and arranging the first sub contents group including the stored first item sequentially in time in operation 560.

That is, the storing of the first item as sub-ordinate item of the first sub contents group in operation 430 of FIG. 4 may include calculating similarities between the keywords of the first item and pre-stored keywords of second item in operation 540 and clustering the first item into first sub contents group in which the second item is included in operation 550.

In addition, the method of storing the broadcast contents according to the current embodiment may further include storing the first sub contents group as sub-ordinate item of a first main contents group, and more specifically, calculating similarities between the first sub contents group and pre-stored second sub contents group and clustering the first sub content groups into the first main contents group in which the second sub content groups are included, based on the calculated similarities. Accordingly, as described in FIG. 3, the sub contents groups $A_1$, $A_2$, and $A_3$ that are similar to each other may be stored so as to be within the main contents group, A.

Meanwhile, the first main contents group including the first sub contents group may also be arranged sequentially. Accordingly, the main contents groups can be arranged as A, B, and C, according to chronological order.

In addition, the determining of at least one keyword representing the first item in operation 420 may further include extracting subtitle information from a received broadcasting signal in operation 520 and determining at least one keyword from the extracted subtitle information in operation 530, thereby determining at least one keyword.

Here, generating a title of the first item by using the determined keywords and generating titles of the first sub contents group in which the first item is included and the first main contents group which is based on the frequency of generation of the title of the first item, may be further included in the current embodiment. Accordingly, while storing the separate news contents a1, a2, and a3, titles thereof may be automatically generated and stored. Also, titles of the sub contents groups and the main contents groups may be automatically generated. The titles may be generated by extracting a noun, a noun phrase, or names of objects (people, places, or organizations) from the extracted subtitle information. Also, the titles may be generated by referring to a special feature of a comment made by a news anchor, the composition of a sentence (subject, verb, and object), and the frequency of appearance of words. In addition, the titles for news segments may be directly obtained from an external web.

Figure 6:
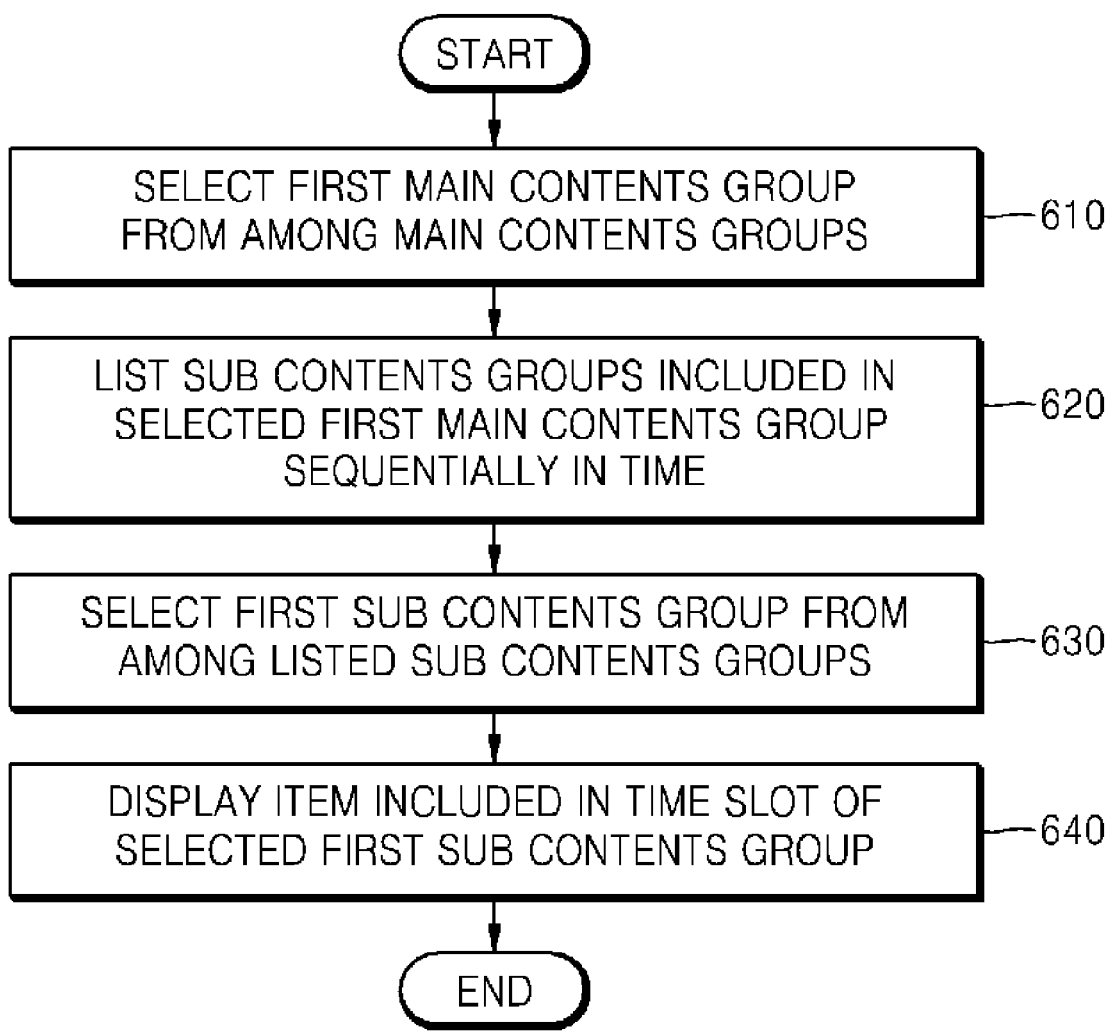
FIG. 6 is a flowchart illustrating a method of displaying stored broadcast contents, according to another embodiment of the present invention.

FIG. 6 is a flowchart illustrating a method of displaying stored broadcast contents, according to another embodiment of the present invention.

Referring to FIG. 6, the method of storing broadcast contents according to the current embodiment of the present invention includes selecting a predetermined first main contents group from among at least one main contents group in operation 610, listing at least one sub contents group included in the selected first main contents group sequentially in time in operation 620, selecting a predetermined first sub contents group from among the listed sub contents groups in operation 630, and displaying at least one item included in a time slot of the selected first sub contents group in operation 640.

Here, the first sub contents group (for example, $A_1$) is clustered with the second sub contents group (for example, $A_2$) in a main contents group (for example, A). Both the first sub contents group and the second sub contents group represent similar events which could be classified together into the main contents group. A predetermined first item that is represented by $A_1$ is clustered with a similar event, i.e., the second item, that is represented by $A_2$.

In addition, the at least one main contents group may be listed based on a time slot and the number of the events included in the corresponding time slot can be displayed as a number or in graph form while listing the main contents groups or sub contents groups.

Meanwhile, the listed main contents groups or sub contents groups may be displayed in a tag cloud form, wherein the tag cloud denotes tags arranged in a suitable location on a display and are made to visually stand out by being highlighted with bold lines so that popular tags or important tags can be found at a glance.

Figure 7A:
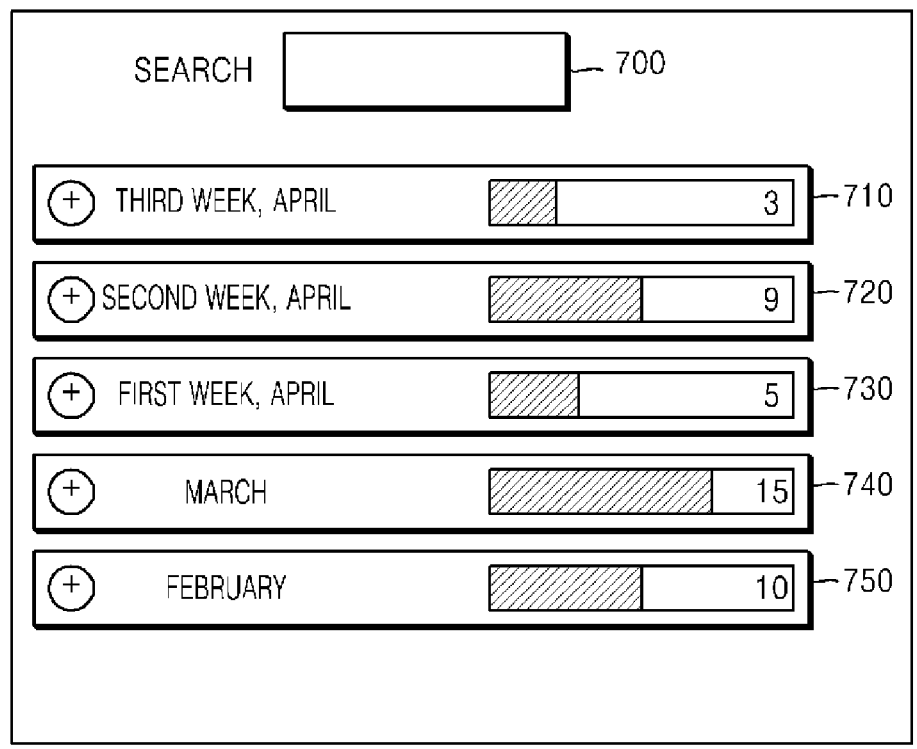
FIGS. 7A-C illustrate diagrams showing the process of displaying stored broadcast contents, according to another embodiment of the present invention.
Figure 7B:
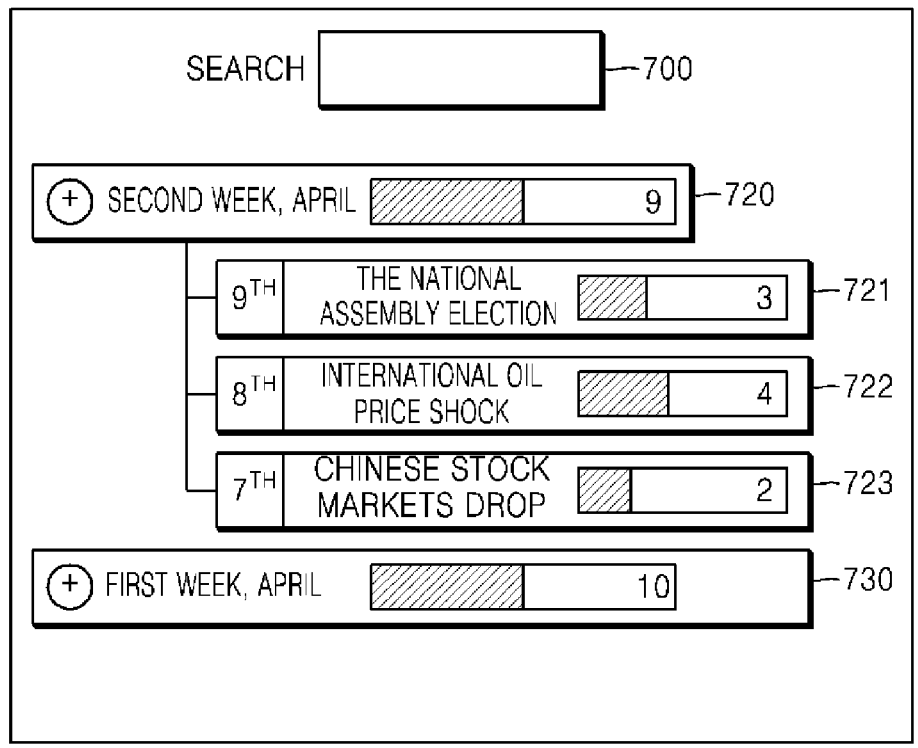
Figure 7C:
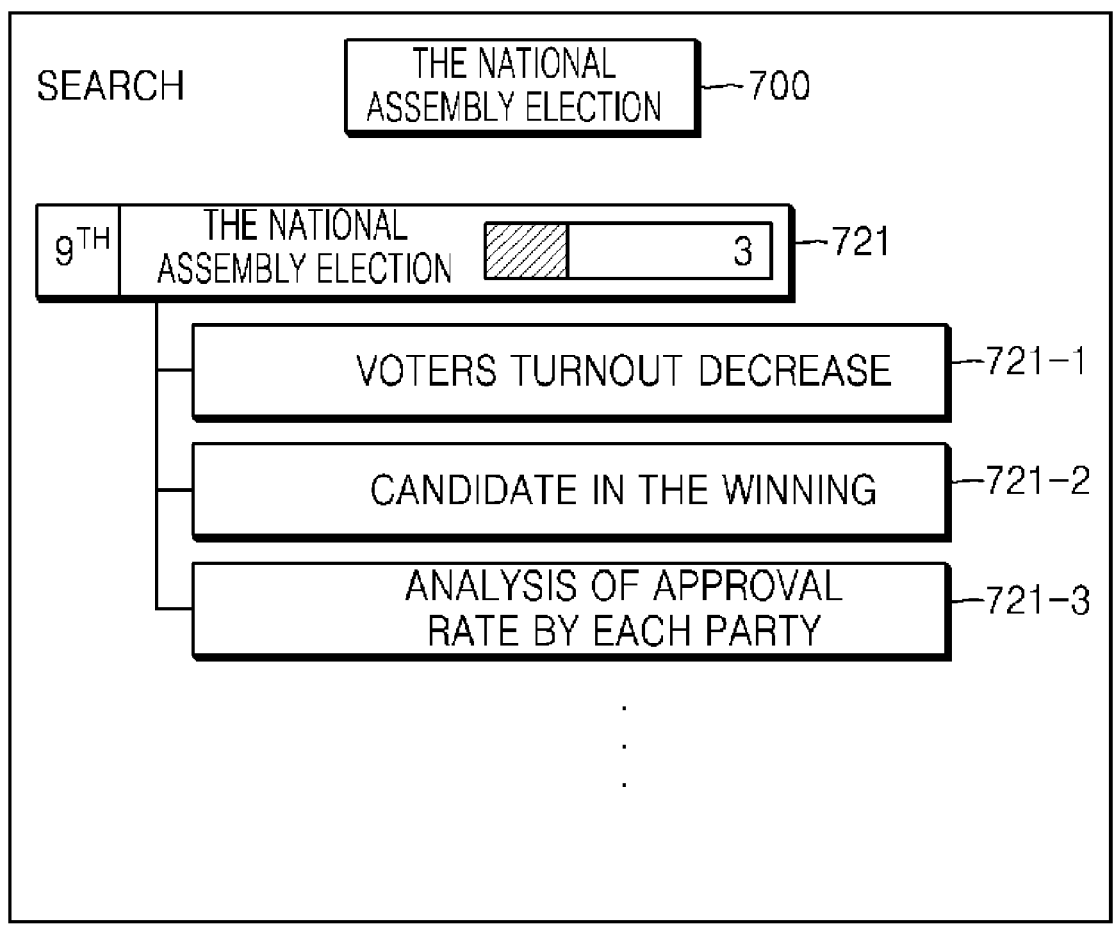

The display method thereof is described more fully with reference to FIGS. 7A-C.

FIGS. 7A-C show the process of displaying the stored broadcast contents, according to another embodiment of the present invention.

Referring to FIG. 7A, in addition to a searching window 700, a plurality of main contents groups 710 through 750 listed based on their respective time slots is illustrated. As described above, the main contents groups and sub contents groups may be arranged according chronological order.

In FIG. 7A, although a title is not displayed in the main contents group, titles indicating hot topics can be displayed, as mentioned above. The mark "+" illustrated in each main contents group indicates that there exist a list of sub-ordinate item and herein, a specific time slot can be selected. Here, as illustrated, graph and number forms indicating the total number of news contents included in corresponding main contents groups are displayed.

Referring to FIG. 7B, when news regarding the "second week of April" 720 is selected, the sub contents groups included in the selected main contents group are listed in chronological order. Thus, a user can identify the events occurring on the "second week of April" at a glance sequentially.

Referring to FIG. 7C, when news relating to "the National Assembly Election" 721 on the 9th of April is selected, all news contents relating to the corresponding event, e.g., topic, on the same day 721-1 through 721-3 are listed.

In addition to the above method, the searching window 700 is directly used to search for the news based on the time slot with the keyword "the National Assembly Election."

Figure 8:
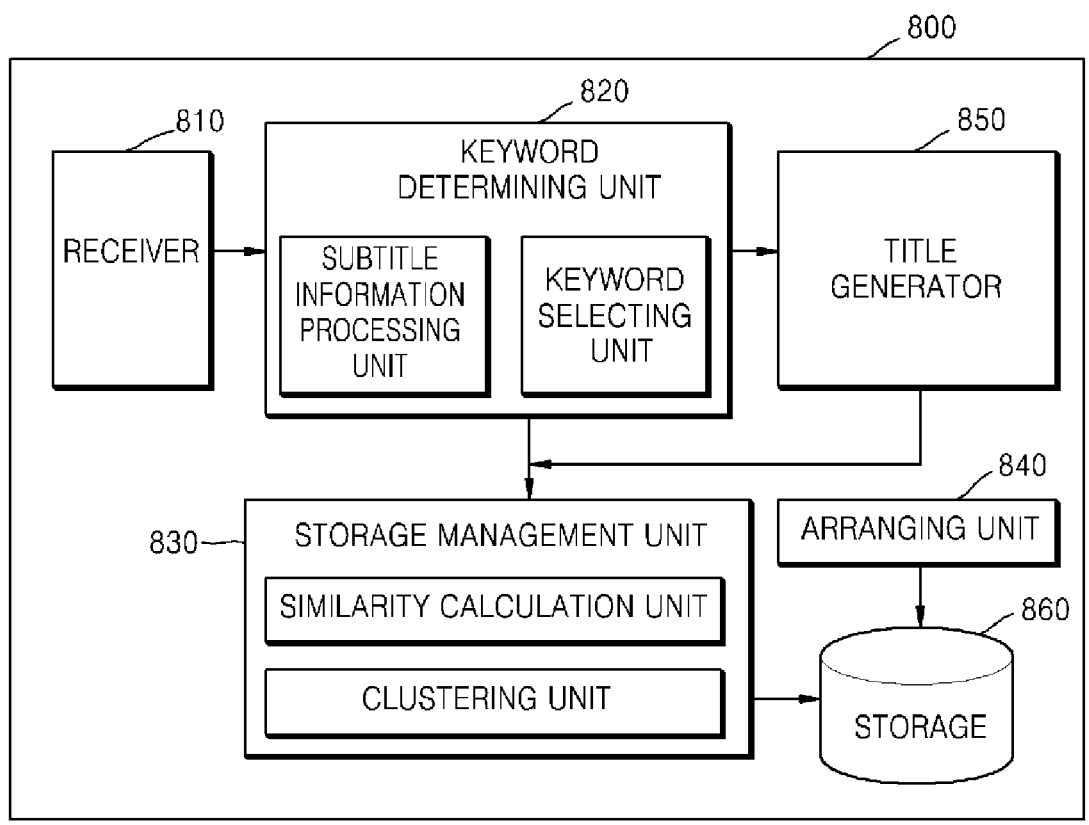
FIG. 8 is a functional block diagram of an apparatus for storing broadcast contents, according to another embodiment of the present invention.

FIG. 8 is a functional block diagram of an apparatus for storing broadcast contents 800, according to another embodiment of the present invention.

Referring to FIG. 8, the apparatus for storing broadcast contents 800 includes a receiver 810, a keyword determining unit 820, a storage management unit 830, and an arranging unit 840, wherein the receiver 810 classifies broadcasting signals into unit segments of first item, the broadcasting signals being received from an external broadcast contents provider, the keyword determining unit 820 determines at least one keyword representing the first item, the storage management unit 830 stores the first item as sub-ordinate item of first sub contents group in storage 860, and the arranging unit 840 arranges the first sub contents group including the stored first item sequentially.

Here, the storage management unit 830 may further include a similarity calculation unit and a clustering unit, wherein the similarity calculation unit calculates the similarity between the keyword of the first item and a pre-stored keyword of second item and the clustering unit clusters the first item into the first sub contents group in which the second item is included, based on the calculated similarity. The keyword determining unit 820 may further include a subtitle information processing unit and a keyword selecting unit, wherein the subtitle information processing unit extracts the subtitle information from the received broadcasting signals and the keyword selecting unit selects at least one keyword from the extracted subtitle information.

In addition, the apparatus for storing broadcast contents 800 may further include a title generator 850 which generates the title of the first item using the keywords determined in the keyword determining unit 820. The title generator 850 may also generate titles of the first sub contents group including the first item and a main contents group according to the frequency of generation of the titles of the first item.

Figure 9:
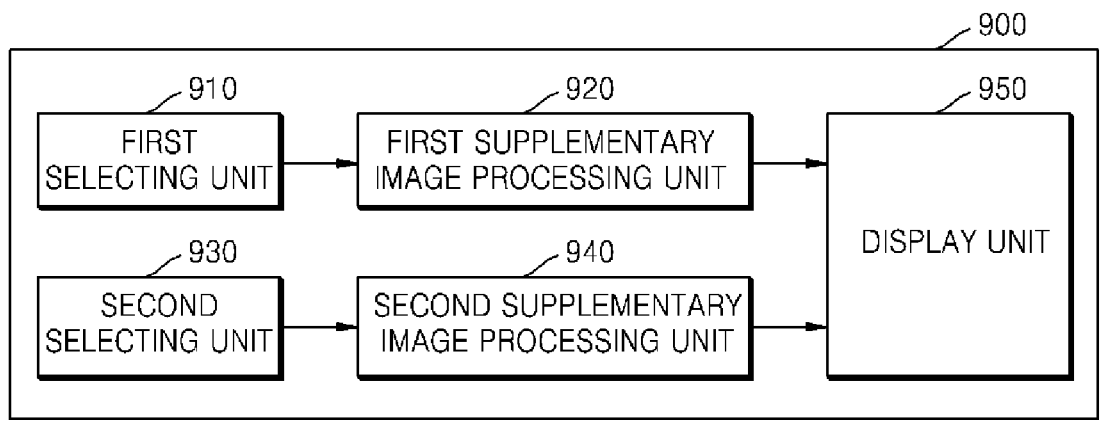
FIG. 9 is a functional block diagram of an apparatus for displaying stored broadcast contents, according to another embodiment of the present invention.

FIG. 9 is a functional block diagram of an apparatus for displaying stored broadcast contents 900, according to another embodiment of the present invention Referring to FIG. 9, the apparatus for displaying stored broadcast contents 900 includes a first selecting unit 910, a first supplementary image processing unit 920, and a second selecting unit 930, and a second supplementary image processing unit 940, wherein the first selecting unit 910 selects a predetermined main contents group from among the at least one main contents group, the first supplementary image processing unit 920 lists at least one sub contents groups included in the selected main contents groups sequentially and displays the sub contents groups in a display unit 950, the second selecting unit 930 selects a predetermined first sub contents group from among the listed sub contents groups, and the second supplementary image processing unit 940 displays at least one event included in the selected first sub contents group in the display unit 950.

According to the method of storing broadcast contents, the method of displaying the stored broadcast contents, and the apparatus therefor of the present invention, a user can easily view headline news based on each week and each day and can collect a number of broadcast contents that are broadcast on various broadcast channels and view the broadcast contents. In addition, the progress of the specific news contents can be easily identified according to each time slot.

The embodiments of the present invention can be written as computer programs and can be implemented in general-use digital computers that execute the programs using a computer readable recording medium.

In addition, a data structure used in the present invention can be recorded to a computer readable recording medium by various means.

Examples of the computer readable recording medium include magnetic storage media (e.g., ROM, floppy disks, hard disks, etc.), and optical recording media (e.g., CD-ROMs, or DVDs). In alternative embodiments, the computer readable recording medium may include storage media such as carrier waves (e.g., transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of storing broadcast contents, the method comprising:
   configuring at least one processor to perform the functions of:
   classifying a broadcasting signal received from an external broadcast contents provider into a plurality of unit segments;
   determining at least one keyword which represents a unit segment for each of the plurality of unit segments;
   storing the plurality of unit segments as sub-ordinate items of a plurality of main contents groups according to the determined keywords;
   re-arranging the plurality of unit segments sequentially in time in each of the plurality of main content groups;
   storing the re-arranged plurality of unit segments as sub-ordinate items of a plurality of sub contents groups according to the sequential order in time; and
   re-arranging the plurality of sub contents groups of the plurality of main contents group sequentially in time.

2. The method of claim 1, wherein the storing the plurality of unit segments as sub-ordinate items of the plurality of main contents groups according to the determined keywords comprises:
   calculating a similarity between the keywords of each of the plurality of unit segments and each of the keywords corresponding to the plurality of main contents groups; and
   clustering each of the plurality of unit segments into at least one of the plurality of main contents groups, based on the calculated similarity.

3. The method of claim 1, wherein determining at least one keyword comprises:
   extracting subtitle information from the received broadcasting signal; and
   selecting at least one keyword from the extracted subtitle information.

4. The method of claim 3, further comprising:
   generating a title of each of the plurality of unit segments by using the determined keywords; and
   generating titles of each of the plurality of main contents groups according to the frequency of generation of the titles of the unit segments stored in a corresponding main contents group.

5. The method of claim 1 further comprising re-arranging the plurality of main contents groups sequentially in time.

6. A method of displaying stored broadcast contents, the method comprising:
   selecting a predetermined first main contents group from among a plurality of main contents groups;
   listing sub contents groups included in the selected predetermined first main contents group sequentially in time wherein the sub contents groups of the selected predetermined first main contents group are re-arranged sequentially in time; and
   selecting a predetermined first sub contents group from among the listed sub contents groups, wherein the selected first sub contents group includes at least one item
   wherein the at least one item of the selected predetermined first sub contents group is re-arranged sequentially in time,
   wherein each of the plurality of main contents groups is assigned to one of a plurality of predetermined events, and the plurality of main contents groups are listed according to the plurality of predetermined events.

7. The method of claim 6, wherein the first sub contents group is included in the same main contents group as a second sub contents group, the second sub contents group depending on a similarity between the first sub contents group and the second sub contents group; and
   a predetermined first item from among the items is included in the same sub contents group as a second item, the second item depending on a similarity between the first item and the second item.

8. The method of claim 6, wherein the listed main contents groups or sub-contents groups display the number of the items included in their own group as a number or in graph form.

9. The method of claim 8, wherein the listed main contents groups or sub-contents groups are displayed in a tag cloud form.

10. The method of claim 6, wherein the plurality of main contents groups are re-arranged sequentially in time.

11. An apparatus for storing broadcast contents, the apparatus comprising:
    a receiver which classifies a broadcasting signal received from an external broadcast contents provider into a plurality of unit segments;

a keyword determining unit which determines at least one keyword which represents a unit segment for each of the plurality of unit segments;

a storage management unit which stores the plurality of unit segments as sub-ordinate items of a plurality of main contents groups according to the determined keywords;

first arranging unit which re-arranges the plurality of unit segments sequentially in time in each of the plurality of main content groups;

a storing unit which stores the re-arranged plurality of unit segments as sub-ordinate items of a plurality of sub contents groups according to the sequential order in time, wherein the main contents group includes at least one of the sub contents groups arranged sequentially in time; and a second arranging unit which re-arranges the plurality of sub contents group sequentially in time in each of the plurality of main content groups.

12. The apparatus of claim 11, wherein the storage management unit comprises:

a similarity calculating unit calculating a similarity between the keywords of each of the plurality of unit segments and each of the keywords corresponding to the plurality of main contents groups; and a clustering unit clustering each of the plurality of unit segments into at least one of the plurality of main contents groups, based on the calculated similarity.

13. The apparatus of claim 11, wherein the keyword determining unit comprises:

a subtitle information processing unit extracting subtitle information from the received broadcasting signal; and a keyword selecting unit selecting at least one keyword from the extracted subtitle information.

14. The apparatus of claim 13, further comprising a title generator generating a title of each of the plurality of unit segments using the determined keywords, wherein the title generator generates titles of each of the plurality of first sub contents groups and each of the plurality of main contents groups according to the frequency of generation of titles of the unit segments stored in a corresponding sub contents group and main contents group.

15. The apparatus of claim 11 further comprising a third arranging unit which re-arranges the plurality of sub contents group sequentially in time in each of the plurality of main content groups.

16. An apparatus for displaying stored broadcast contents, the apparatus comprising:

a first selecting unit selecting a predetermined first main contents group from among a plurality of main contents groups;

a first supplementary image processing unit listing sub contents groups included in the selected predetermined first main contents group sequentially in time wherein the sub contents groups of the selected predetermined first main contents group are re-arranged sequentially in time; and a second selecting unit selecting a predetermined first sub contents group from among the listed sub contents groups, wherein the selected first sub contents group includes at least one item, wherein the at least one item of the selected predetermined first sub contents group is re-arranged sequentially in time, and wherein each of the plurality of main contents groups is assigned to one of a plurality of predetermined events, and the plurality of main contents groups are listed according to the plurality of predetermined events.

17. The apparatus of claim 16, wherein the first sub contents group is included in the same main contents group as a second sub contents group, the second sub contents group depending on a similarity between the first sub contents group and the second sub contents group; and a predetermined first item from among the items is included in the same sub contents group as a second item, the second item depending on a similarity between first item and the second item.

18. The apparatus of claim 17, wherein the listed main contents groups or sub-contents groups display the number of the items included in their own group as a number or in graph form.

19. The apparatus of claim 18, wherein the listed main contents groups or sub-contents groups are displayed in a tag cloud form.

20. A non-transitory computer readable recording medium having embodied thereon a computer program for executing the method of claim 1.

21. The apparatus of claim 16, wherein the plurality of main contents groups are re-arranged sequentially in time.

* * * * *